(12) United States Patent
Zhu

(10) Patent No.: US 7,734,868 B2
(45) Date of Patent: Jun. 8, 2010

(54) UNIVERSAL RAID CLASS DRIVER

(75) Inventor: Qiming Zhu, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 652 days.

(21) Appl. No.: 10/726,812

(22) Filed: Dec. 2, 2003

(65) Prior Publication Data

US 2005/0120170 A1 Jun. 2, 2005

(51) Int. Cl.
G06F 13/00 (2006.01)
G06F 12/16 (2006.01)

(52) U.S. Cl. ...................... 711/114; 719/325

(58) Field of Classification Search .................. 719/325; 711/114

See application file for complete search history.

(56) References Cited

U.S. PATENT DOCUMENTS

| 5,163,149 | A | * | 11/1992 | Brantley et al. ............. 713/375 |
| 5,548,712 | A |   | 8/1996  | Larson et al. |
| 5,787,463 | A | * | 7/1998  | Gajjar ........................ 711/114 |
| 5,822,782 | A | * | 10/1998 | Humlicek et al. ........... 711/170 |
| 6,058,455 | A | * | 5/2000  | Islam et al. ................. 711/114 |
| 6,065,096 | A |   | 5/2000  | Day et al. |
| 6,145,028 | A |   | 11/2000 | Shank et al. |
| 6,282,670 | B1 | * | 8/2001 | Rezaul Islam et al. ......... 714/6 |
| 6,651,165 | B1 |   | 11/2003 | Johnson |
| 6,973,516 | B1 | * | 12/2005 | Athanas et al. ............. 710/100 |
| 7,139,693 | B1 | * | 11/2006 | Dake et al. .................... 703/24 |
| 7,174,538 | B2 | * | 2/2007 | Asco et al. ................... 717/116 |
| 7,424,637 | B1 | * | 9/2008 | Schoenthal et al. ............ 714/6 |

| 2002/0069245 | A1 | * | 6/2002 | Kim ............................. 709/203 |
| 2003/0070043 | A1 | * | 4/2003 | Merkey ....................... 711/114 |
| 2004/0003135 | A1 | * | 1/2004 | Moore ......................... 709/321 |
| 2004/0024962 | A1 | * | 2/2004 | Chatterjee et al. ........... 711/114 |
| 2004/0064828 | A1 | * | 4/2004 | Cox ............................. 719/327 |

(Continued)

FOREIGN PATENT DOCUMENTS

| EP | 0723234 A1 | 7/1996 |
| EP | 1347369 A2 | 9/2003 |

OTHER PUBLICATIONS

Baker et al., "The Windows® 2000 Device Driver Book," Prentice Hall PTR, 2001, pp. 166-168.*

(Continued)

*Primary Examiner*—Shane M Thomas
(74) *Attorney, Agent, or Firm*—Townsend and Townsend and Crew LLP

(57) ABSTRACT

A RAID class driver model enables users to easily combine two or more disks into a bootable RAID system without specialized disk controllers and allows the creation of RAID systems using disks of different types, controllers, and interfaces. A RAID class driver is initialized in response to the identification of a RAID controller. Disk controllers return RAID-specific device identifications, rather than a standard disk device identifications, for each disk to be included in the RAID system. The RAID class driver binds a RAID-specific functional interface to each disk having a RAID-specific device identification and combines the disks into a disk object representing the entire RAID system. The disk object provides the operating system with a standard disk device identification. The operating system loads a standard disk driver to interface with the disk object, thereby enabling transparent access to the RAID system.

35 Claims, 5 Drawing Sheets

U.S. PATENT DOCUMENTS

2004/0073747 A1* 4/2004 Lu .............................. 711/114
2004/0160975 A1* 8/2004 Frank et al. ................. 370/432
2004/0268079 A1* 12/2004 Riedle et al. ................ 711/173

OTHER PUBLICATIONS

The Software-RAID HowTo: Why RAID?, http://web.archive.org/web/20021201082645/www.tldp.org/HOWTO/Software-RAID-HOWTO-2.html, archived on Dec. 1, 2002, 5 pages.

Search/Examination Report to EP 04 028 611.4—1245 dated Jun. 25, 2007, 7 pages.

"Windows Driver Model Article", 1999, *PHD Computer Consultants Ltd.*, pp. 1-13.

Office Action from corresponding EP Application No. 04028611.4 dated Mar. 3, 2009, 8 pages.

* cited by examiner

UNIVERSAL RAID CLASS DRIVER

BACKGROUND OF THE INVENTION

The present invention relates to the field of data storage devices. Computers often store large quantities of data, including data such as music, video, games, applications, and other valuable information, on hard disk drives and other data storage devices, which are referred to herein generally as "disks". As users' storage needs increase and the price of disks fall, computers often employ multiple disks to meet their storage needs.

To improve performance, reliability, and efficiency in using multiple disks for data storage, two or more disks can be combined into a single "logical" disk. One common disk architecture for combining multiple disks is RAID (Redundant Array of Independent Disks). Although RAID systems can provide improved disk performance and/or reliability, RAID systems are complicated to set up and configure. Additionally, RAID systems typically require specialized disk controllers and driver software. Thus, RAID systems are typically too expensive and too difficult for use by most computer users.

Additionally, because some current RAID systems require specialized disk controllers, they are limited in the number and type of disks that can be combined. For example, it is virtually impossible for current RAID systems to combine an EIDE disk and a SCSI disk in the same RAID system. In other RAID systems, the computer operating systems combines disk partitions, rather than the underlying disk itself, to create the RAID system. Because disk partitions are defined by the operating system, the disk partitions, and hence the entire RAID system, are inaccessible until the operating system has loaded. Thus in these implementations, the computer cannot be booted from the RAID system.

It is therefore desirable for a system and method to enable users to easily combine two or more disks into a bootable RAID system without specialized disk controllers. It is further desirable to be able to create RAID systems using disks of different types, controllers, and interfaces.

BRIEF SUMMARY OF THE INVENTION

The invention generally is a RAID class driver model that enables users to easily combine two or more disks into a bootable RAID system without specialized disk controllers and allows the creation of RAID systems using disks of different types, controllers, and interfaces. A RAID class driver is initialized in response to the identification of a RAID controller. Disk controllers return RAID-specific device identifications, rather than standard disk device identifications, for each disk to be included in the RAID system. The RAID class driver binds a RAID-specific functional interface to each disk having a RAID-specific device identification and combines the disks into a disk object representing the entire RAID system. The disk object provides the operating system with a standard disk device identification. The operating system loads a standard disk driver to interface with the disk object, thereby enabling transparent access to the RAID system.

In an embodiment, a storage disk device driver architecture comprises a RAID class driver having a physical device object representing a RAID system. The RAID system includes a plurality of disks. Each disk is associated with a functional device object adapted to interface with a physical device object representing the disk. The physical device object representing each disk provides a RAID-specific device identification. In a further embodiment, the physical device object that provides a RAID-specific device identification is included in a disk controller driver adapted to interface with a disk controller. In still another embodiment, the physical device object representing the RAID system is adapted to provide a standard disk device identification to an operating system.

In an embodiment, the RAID class driver is adapted to combine each disk into a RAID system. In one aspect of this embodiment, in response to receiving a request to write a data block to RAID system, the RAID class driver is adapted to mirror the data block on at least a portion of the plurality of disks via the associated functional device objects. In another aspect of this embodiment, in response to receiving a request to write a first and second data block to RAID system, the RAID class driver is adapted to write via the associated functional device objects the first data block to a first portion of the plurality of disks and to write via the associated functional device objects the second data block to a second portion of the plurality of disks. In another aspect of this embodiment, in response to receiving a request to write a first and second data block to RAID system, the RAID class driver is adapted to write via the associated functional device objects an error correction block to a portion of the plurality of disks.

In yet a further embodiment, a first portion of the plurality of disks is associated with a first disk controller of a first type and a second portion of the plurality of disks is associated with a second disk controller of a second type. In one aspect of this embodiment, the first type is an EIDE type controller and the second type is a SCSI type controller. In another aspect, the first type is a serial ATA type controller and the second type is a parallel ATA type controller. In a third aspect, the second type is a controller for an external disk.

BRIEF DESCRIPTION OF THE DRAWINGS

The invention will be described with reference to the drawings, in which.

DETAILED DESCRIPTION OF THE INVENTION

Figure 1:
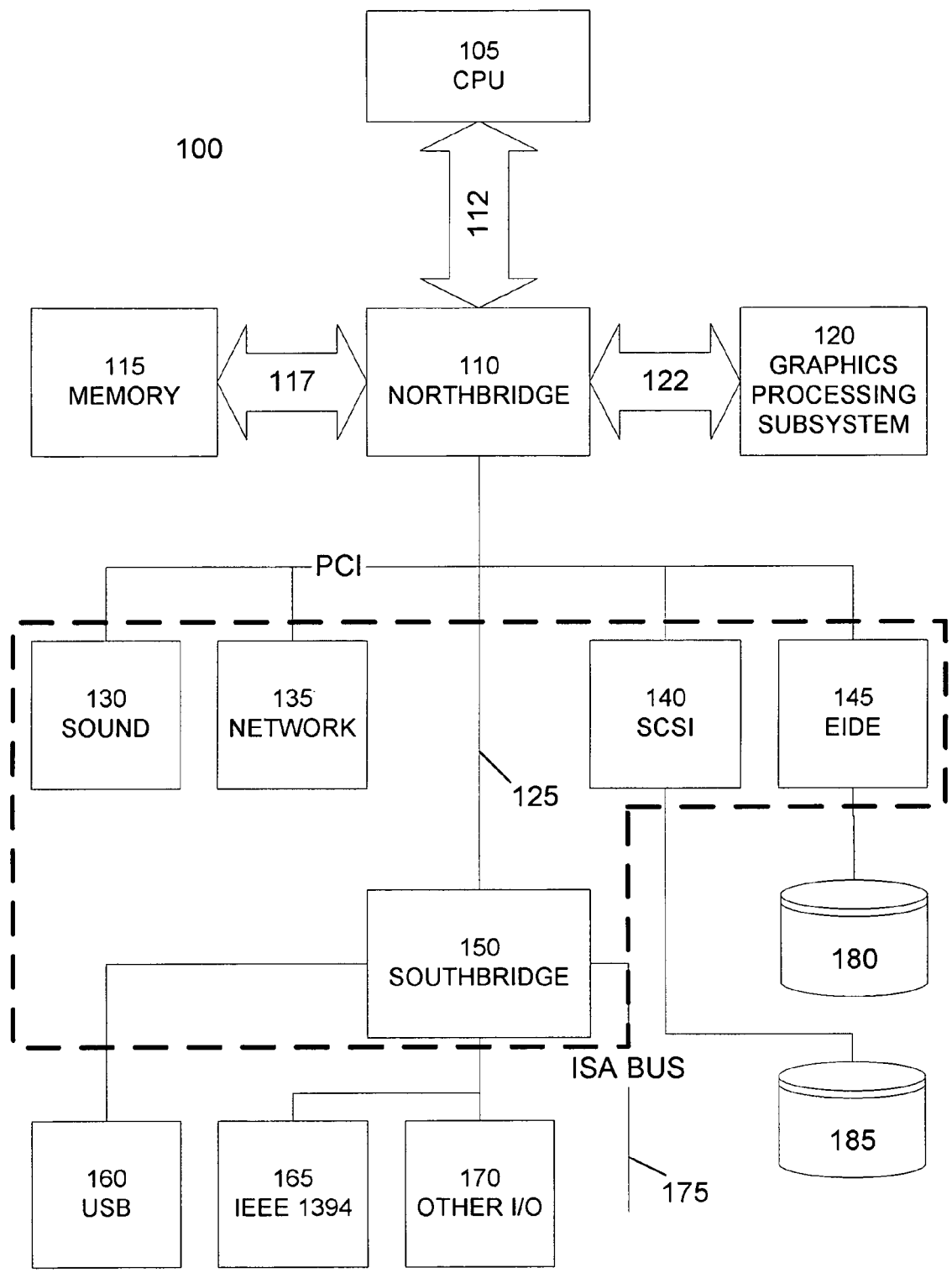
FIG. 1 illustrates a computer system suitable for implementing an embodiment of the invention.

FIG. 1 is a block diagram of a computer system 100, such as a personal computer, video game console, personal digital assistant, or other digital device, suitable for practicing an embodiment of the invention. Computer system 100 includes a central processing unit (CPU) 105 for running software applications and optionally an operating system. In an embodiment, CPU 105 is actually several separate central processing units operating in parallel.

CPU 105 is connected with Northbridge 110 via CPU bus 112. The Northbridge 110 passes data between the CPU 105 and the memory 115 via memory bus 117, and between CPU 105 and graphics processing subsystem 120 via graphics bus 122. Buses 112, 117, and 122 may be implemented as any type of data transport bus, including proprietary processor and memory buses, and AGP, PCI, PCI-X, and Hypertransport buses. In an alternate embodiment, CPU 105 includes a memory controller that interfaces with memory 115 directly, bypassing Northbridge 110.

The graphics subsystem 120 includes a graphics processing unit and optionally graphics memory for storing pixel data associated with output images. The graphics subsystem 120 periodically outputs pixel data for an image to a display device. Display device is any device capable of displaying visual information in response to a signal from the computer system 100, including CRT, LCD, plasma, and OLED displays. Computer system 100 can provide the display device with an analog or digital signal. In an alternate embodiment, the graphics processing subsystem is integrated with other computer system components, such the Northbridge 110.

Northbridge 110 is further interfaced with PCI bus 125. PCI bus 125 connects numerous peripheral devices with the computer system 100. Example peripheral devices include sound device 130, network interface 135, and disk controllers such as SCSI controller 140 and EIDE controller 145. Network interface 135 enables computer system 100 to communicate with other computer systems via an electronic communications network, and may include wired or wireless communication over local area networks and wide area networks such as the Internet.

The disk controllers enable access to non-volatile storage devices for applications and data and may include fixed disk drives, removable disk drives, flash memory devices, and CD-ROM, DVD-ROM, or other optical storage devices. In computer system 100, SCSI controller 140 is connected with one or more SCSI disks 185, and EIDE controller 145 is connected with one or more EIDE drives 180. EIDE drives may include drives using a parallel ATA interface (PATA) or a serial ATA interface (SATA). In a further embodiment, additional disks can be connected through additional disk controllers, which are typically used for internal drives, through USB and IEEE 1394 interfaces, which are typically used for external drives, and through wired and wireless network interfaces.

Southbridge 150 is also connected with PCI bus 125. Together, the Northbridge and Southbridge provide core logic functions of the computer system. Southbridge 150 enables I/O interfaces for numerous input and output devices, such as keyboards, mice, joysticks, touchpads, digital still and video cameras, printers, scanners, and digital music devices. Southbridge 150 may support any number of I/O interfaces, such as USB 1.0 or 2.0 interface 160, IEEE 1394 interface 165, and other I/O interfaces 170, including serial, parallel, PS/2, and Bluetooth interfaces. Southbridge 150 also may support legacy peripheral devices through ISA bus 175. In a further embodiment, some or all of the peripheral devices 155 can be integrated into Southbridge 150, including disk controllers 140 and 145, sound device 130, network interface 135, and I/O interfaces 160, 165, and 170.

Figure 2A:
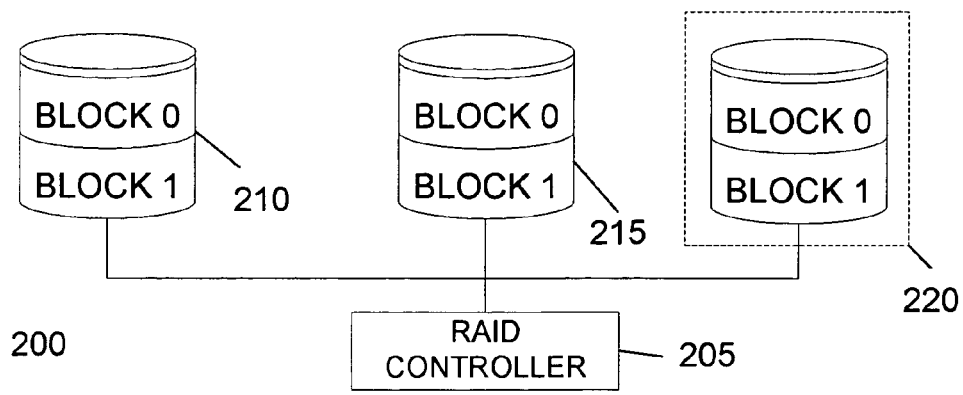
FIGS. 2A, 2B, and 2C illustrate example RAID system implementations that may be created by an embodiment of the invention.
Figure 2B:
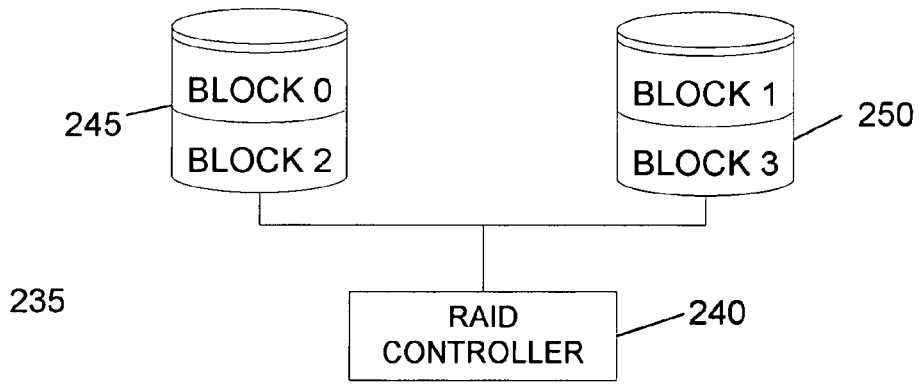
Figure 2C:
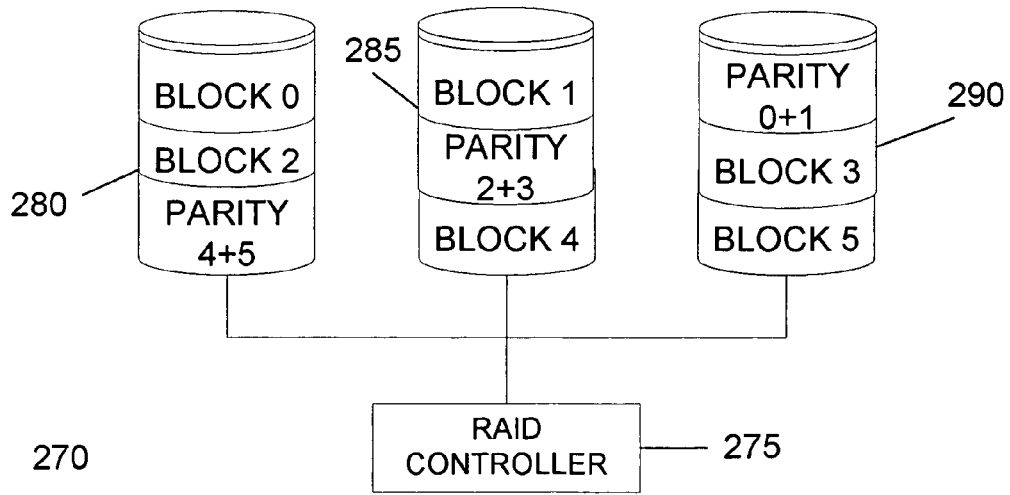

FIGS. 2A, 2B, and 2C illustrate example prior art RAID system implementations that may be created by an embodiment of the invention. As discussed above, a RAID system combines multiple disks into a single "logical" disk. RAID systems are typically divided into different categories or levels. There are numerous different levels, each of which includes some combination of mirroring, striping, and/or parity information. Each RAID level offers a different degree of improved reliability and/or higher performance. Discussed below are three of the more common RAID implementations; however, the invention is generally applicable to any combination of drives in any RAID implementation.

FIG. 2A illustrates an example RAID 1 implementation 200, also referred to as mirroring, that provides improved reliability. As data is written to RAID system 200, RAID controller 205 writes the data in parallel to drives 210 and 215. In this RAID system, writing, or mirroring, data on drives 210 and 215 provides an automatic backup of data should one disk fail or become corrupted. In a further embodiment, a third disk 220 is connected with RAID controller 205 as a "hot spare." In the event of a failure of disk 210 or 215, RAID controller 205 will activate disk 220 and copy over the contents of the remaining operable drive. Subsequent data writes will then be mirrored on disk 220, rather than the defective drive.

FIG. 2B illustrates an example RAID 0 implementation 235, also referred to as striping, that provides improved disk read and write performance. RAID 0 implementation 235 divides data into blocks and distributes the blocks over two disks, 245 and 250. RAID controller 240 reads and writes data from both drives in parallel, effectively doubling disk performance for disk accesses larger than one "block" of data. In further embodiment, data blocks are distributed over more than two drives, providing even greater performance.

FIG. 2C illustrates an example RAID 5 implementation 270 that provides both improved disk performance and reliability. As with striping, RAID controller 275 divides data into blocks and distributes the blocks over two disks. Additionally, RAID controller 275 computes a parity or error correction block for every two data blocks. Each error correction block can be used by the RAID controller 275 to repair or reconstruct lost or corrupted data from its associated data blocks. As data in any block is changed, the RAID controller 275 rewrites not only the changed block but also updates the corresponding parity. In RAID 5 implementation, the parity blocks are alternately written to each of the disks to evenly distribute the load on disks. For example, RAID controller writes blocks 0 and 1 to disks 280 and 285 and the corresponding parity block to disk 290, and writes blocks 2 and 3 to disks 280 and 290 and the corresponding parity block to disk 285.

Figure 3:
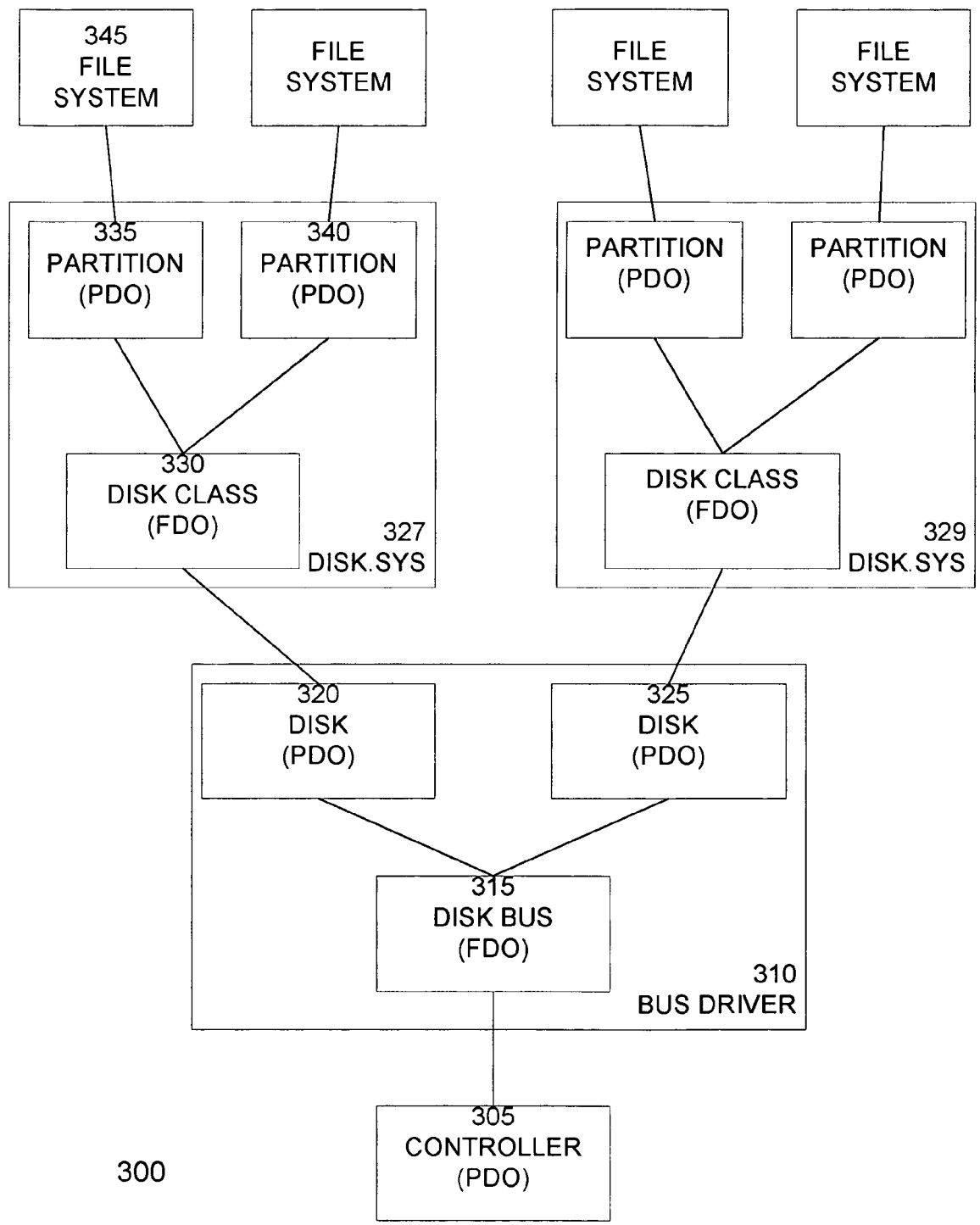
FIG. 3 illustrates an example prior device driver architecture enabling a computer to access disks.

FIG. 3 illustrates an example prior device driver architecture 300 enabling a computer to access disks. Microsoft® Windows® is one operating system that uses this device driver architecture for accessing disks. In device driver architecture 300, devices are located and accessed via a tree data structure supervised by a PnPManager driver. The PnPManager driver creates the device driver tree by starting at a root system node and enumerating a first level of connected "child" devices. A driver is loaded for each connected child device, which enables the enumeration of further child devices (e.g., the "grandchildren" of the root node). This is repeated for each level of child devices until all of the devices have been located and their respective drivers loaded.

For device driver architecture 300, the PnPManager will locate all of the controllers, such as a PCI controller and any disk controllers from the root node. The PnPManager creates a Physical Device object (PDO) for a disk controller 305. The disk controller PDO 305 has a specific device ID. From the device ID, the PnPManager determines the appropriate driver to be loaded. In the case of the disk controller PDO 305, a bus driver 310 is loaded. The bus driver 310 includes a disk bus Functional Device object (FDO) 315 for interfacing with the disk controller PDO 305.

The PnPManager enumerates the devices of the disk bus FDO 315 to locate Disk PDOs 320 and 325. Each disk PDO corresponds to a disk controlled by the disk controller. Like the disk controller PDO 305, disk PDOs 320 and 325 have their own device IDs. In the case of disk PDOs 320 and 325, the device ID specifies a generic disk device, "GenDisk."

In response to the device ID of "GenDisk," the PnPManager loads "Disk.Sys" drivers 327 and 329. Disk.Sys driver instance 327 includes an instance 330 of Disk Class FDO 330 for interfacing with disk PDO 320. The PnPManager enumerates the devices of disk class FDO to locate disk partitions PDOs 335 and 340. Disk partition PDOs 335 and 340 correspond to disk partitions on the disk controlled by Disk.Sys instance 327. From partition PDO 335, the PnPManager identifies the file system 345 for the disk partition, enabling the computer system to access data stored on the partition.

Figure 4:
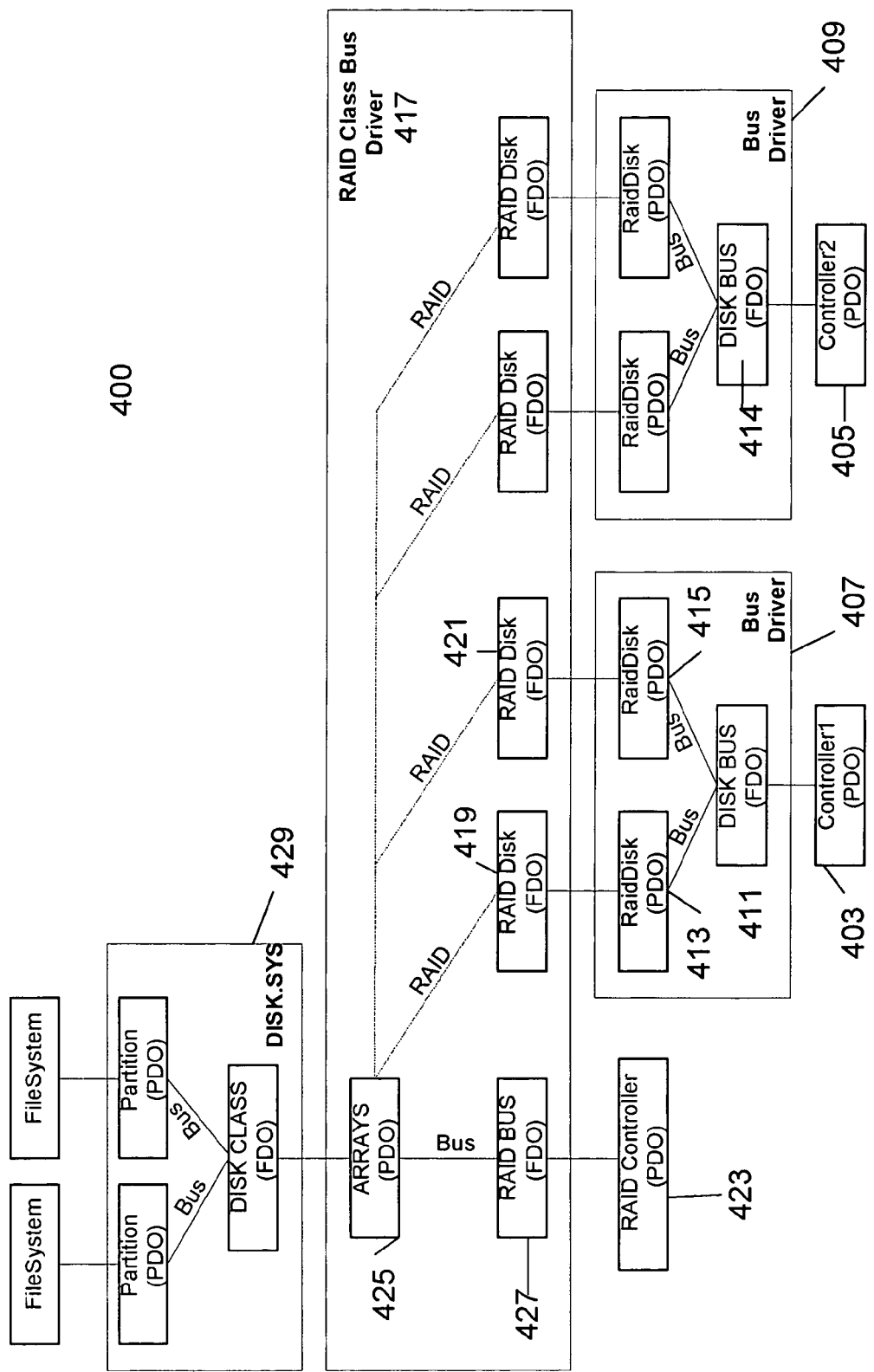
FIG. 4 illustrates a device driver architecture enabling a computer to access disks and RAID systems according to an embodiment of the invention.

FIG. 4 illustrates a device driver architecture 400 enabling a computer to access disks and RAID systems according to an embodiment of the invention. As in device driver architecture 300, a PnPManager or other operating system component responsible for managing and configuring devices scans a root node to locate and identify disk controllers. PnPManager creates disk controller PDOs for each disk controller identified. Disk controllers can be any hardware interface for one or more disks, including EIDE, SCSI, USB, and IEEE 1394 interfaces. For example, device driver architecture 400 includes disk controller PDOs 403 and 405.

The PnPManager determines the type of disk controller from a device ID provided by the disk controller PDOs, and loads the appropriate bus drivers, such as bus drivers 407 and 409. Each bus driver includes a Disk Bus FDO, such as Disk Bus FDOs 411 and 414, for interfacing with the corresponding disk controller PDO.

The PnPManager enumerates the disks connected with each disk controller using the corresponding Disk Bus FDO. A disk PDO is created for each disk connected with a disk controller. For example, disk PDOs 413 and 415 are created for two disks connected with the disk controller associated with bus driver 407. For disks that are part of a RAID system, the disk PDO does not have a device ID of "GenDisk." Instead, disks that are part of a RAID system have a different device ID, such as RAIDDisk, indicating to the PnPManager that a RAID class driver 417 should be loaded.

RAID class driver 417 is loaded if any disks located by a disk bus FDO have a device ID of "RAIDDisk" or any other RAID-specific device ID. RAID class driver 417 will create RAID disk FDO for each disk having a RAIDDisk device ID. For example, RAID disk FDOs 419 and 421 are created for the disk PDOs 413 and 415, respectively.

The purpose of the RAID class driver 417 is to combine two or more disks into a RAID system. In an embodiment, a user can designate disks to be combined in a RAID system using the computer system BIOS configuration utility. The user can also set the type or level of RAID system to be created. The RAID configuration settings, including the RAID level and the drives belonging to the RAID system, are stored in the computer system CMOS configuration memory, along with other BIOS configuration settings.

In an embodiment, the disk controllers, such as disk controllers associated with disk controller PDOs 403 or 405, read the CMOS configuration to determine if any or all of its connected disks are to be part of the RAID system, and if so, the disk controller will report the device ID of the disks as "RAIDDisk" rather than "GenDisk."

In an embodiment, RAID controller PDO 423 is also created from scanning the root node. The RAID controller PDO 423 has a device ID, such as RAIDBus, also associated with the RAID class driver 417. This ensures that the RAID class driver 417 is always loaded as a bus driver, and that an array PDO 425, discussed below, is created. In one embodiment, the RAID controller PDO 423 corresponds to a "phantom" controller that only has the responsibility for ensuring the RAID class driver 417 and array PDO 425 are loaded. In an alternate embodiment, RAID controller PDO 423 is associated with RAID controller hardware for performing one or more functions of the RAID system, such as automatically computing the parity or error correction block for two or more data blocks.

RAID class driver 417 creates an array PDO 425 representing the combination of all of the drives in the RAID system. If there are multiple independent RAID systems in a computer system, then RAID class driver 417 creates an array PDO for each RAID system. Array PDO 425 is created by enumerating the devices of the RAID bus FDO 427, which in turn is created to interface with RAID controller PDO 423. The array PDO 425 coordinates all data access to the disks forming the RAID system.

To interface with the operating system, the array PDO 425 returns a device ID of "GenDisk," which is the same as for any other disk. Thus, the operating system views the RAID system as a single ordinary disk, rather than a combination of disks. In response to the array PDO 425, the PnPManager loads a disk device driver 429, such as Disk.Sys. As with other GenDisk type disks discussed above, the disk device driver 429 includes a disk class FDO for interfacing with the array PDO 425 and one or more partition PDOs defining file systems accessible to the operating system.

By using a RAID class driver as a middle tier between the disk controller drivers and the operating system disk drivers, device architecture 400 enables RAID systems to be created and managed regardless of the degree of operating system support. Furthermore, the RAID class driver 417 can aggregate disks from many different controllers into a RAID system. Any type of disk controller can contribute disks to the RAID system; the only requirement is that the disk controller returns a RAIDDisk device ID for its associated disks.

Figure 5:
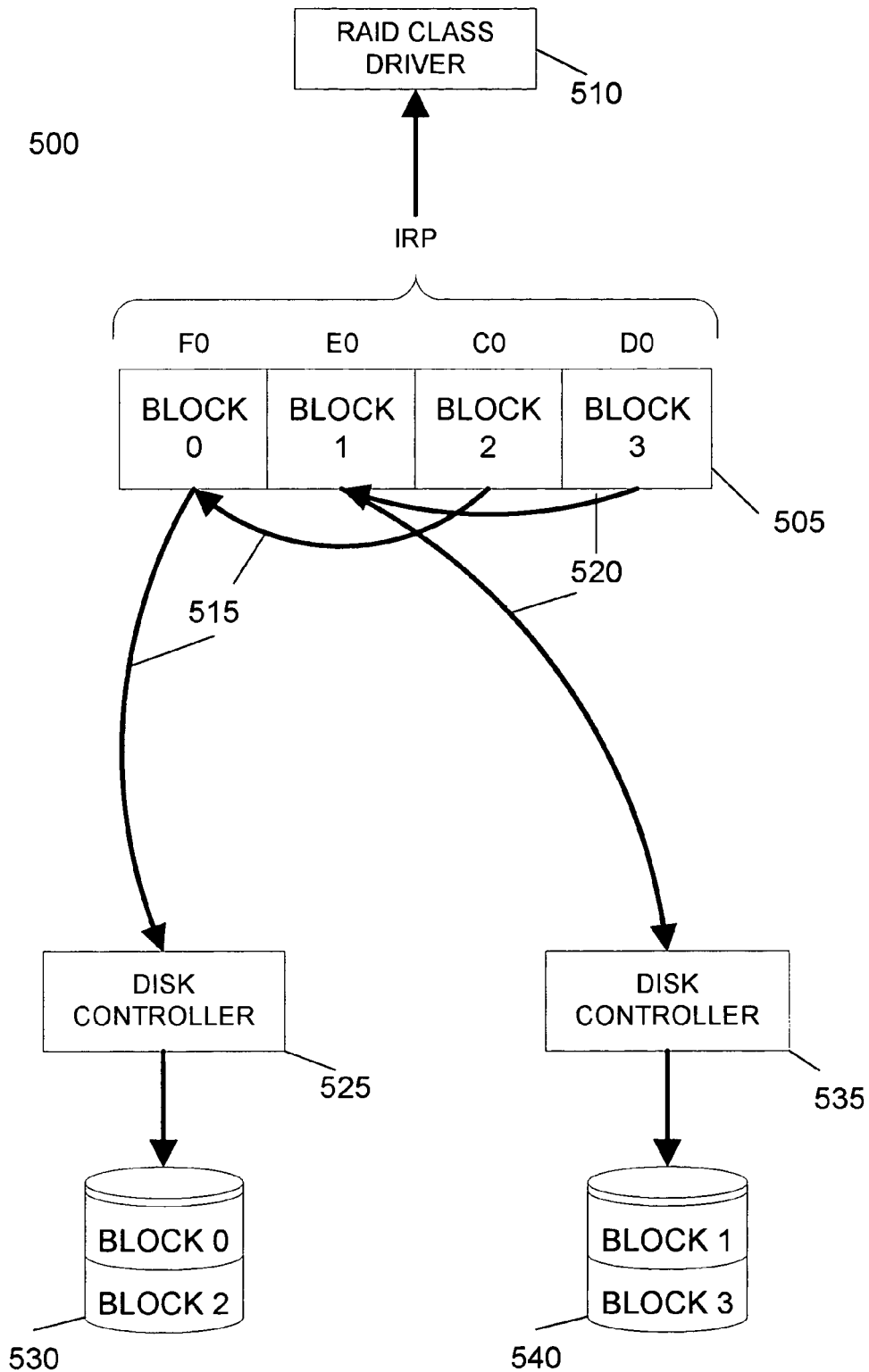
FIG. 5 illustrates optimized RAID system data access enabled by an embodiment of the invention.

Additionally, the RAID class driver can optimize data accesses with the RAID system. FIG. 5 illustrates optimized RAID system data access 500 enabled by an embodiment of the invention. An IO Request Package (IRP) 505 is sent to the RAID class driver 510 to be written to the RAID system. In this example, IRP 505 includes four contiguous blocks of data to be written to the RAID system. Although these blocks of data are logically contiguous, the blocks may be stored in contiguous or non-contiguous blocks of system memory. For example, Block 0 is at address F0, Block 1 is at E0, Block 2 is at C0, and Block 3 is at D0. In an embodiment, each block can be accessed in system memory via a physical memory address or a virtual memory address. RAID class driver 510 receives the IRP 505 from the operating system and in this example determines that Blocks 0 and 2 should be written to disk 530 and Blocks 1 and 3 should be written to disk 540.

To optimize this operation, the RAID class driver 510 recognizes that two blocks need to be written to each disk. Rather than write each block in a separate disk operation, RAID class driver 510 groups the data accesses together into one data access for each disk. In an embodiment, RAID class driver 510 writes data to each disk by initiating a direct memory access (DMA) operation between system memory and the appropriate disk controller. In this embodiment, RAID class driver initiates a first DMA operation 515 transferring Blocks 0 and 2 to disk controller 525. RAID class driver 510 also initiates a second DMA operation 520 transferring Blocks 1 and 3 to disk controller 535. The disk controllers 525 and 535 receive the appropriate data blocks from the DMA transfers and write the data blocks to their respective disks.

This invention enables users to easily combine two or more disks into a bootable RAID system without specialized disk controllers and allows the creation of RAID systems using disks of different types, controllers, and interfaces. The invention additionally allows for further optimizations of disk access. Although the invention has been discussed with respect to specific examples and embodiments thereof, these are merely illustrative, and not restrictive, of the invention. Thus, the scope of the invention is to be determined solely by the claims.

What is claimed is:

1. A computer-readable medium containing a storage disk device driver architecture for access by a processing system, wherein the architecture comprises:
   a RAID class driver including:
      a first physical device object representing a RAID system comprised of a plurality of physical disks; and
      a plurality of functional device objects, each associated with one of the physical disks and adapted to interface with a respective second physical device object that represents that physical disk, wherein each second physical device object provides a RAID-specific device identification, wherein the first physical device object is attached with each functional device object, and wherein each functional device object is associated with a different physical disk,
   wherein the RAID class driver is configured to be loaded into the processing system when a RAID-specific device identification is provided.

2. The computer-readable medium of claim 1, wherein a second physical device object, providing a RAID-specific device identification, is included in a disk controller driver adapted to interface with a disk controller, wherein the disk controller driver is stored on the computer readable medium.

3. The computer-readable medium of claim 1, wherein the first physical device object representing the RAID system is adapted to provide a standard disk device identification to an operating system.

4. The computer-readable medium of claim 1, wherein the RAID class driver is adapted to combine each physical disk into the RAID system.

5. The computer-readable medium of claim 4, wherein in response to receiving a request to write a data block to RAID system, the RAID class driver is adapted to mirror the data block on at least a portion of the plurality of physical disks via the associated functional device objects.

6. The computer-readable medium of claim 4, wherein in response to receiving a request to write a first and second data block to RAID system, the RAID class driver is adapted to write via the associated functional device objects the first data block to a first portion of the plurality of physical disks and to write via the associated functional device objects the second data block to a second portion of the plurality of physical disks.

7. The computer-readable medium of claim 4, wherein in response to receiving a request to write a first and second data block to RAID system, the RAID class driver is adapted to write via the associated functional device objects an error correction block to a portion of the plurality of physical disks.

8. The computer-readable medium of claim 1, wherein the physical device object representing a RAID system is a child of a RAID controller functional device object adapted to interface with a RAID controller physical device object.

9. The computer-readable medium of claim 1, wherein the RAID class driver is adapted to configure the physical device object representing a RAID system according to RAID configuration data stored in a computer system configuration memory.

10. The computer readable medium of claim 1, wherein the second physical device objects interface with the physical disks through at least two disk controllers, and wherein a first portion of the plurality of physical disks is associated with a first disk controller of a first type and a second portion of the plurality of physical disks is associated with a second disk controller of a second type.

11. The computer-readable medium of claim 10, wherein the first type is an LIDE type controller and the second type is a SCSI type controller.

12. The computer-readable medium of claim 10, wherein the first type is a serial ATA type controller and the second type is a parallel ATA type controller.

13. The computer-readable medium of claim 10, wherein the second type is a controller for an external disk.

14. The computer-readable medium of claim 1, wherein the RAID class driver is adapted to optimize data access by combining separate data access operations associated with a physical disk of the RAID system into a single data access operation.

15. The computer-readable medium of claim 1 wherein the RAID-specific device identifications are obtained from a CMOS configuration.

16. An integrated circuit adapted to perform core logic functions of a computer, the integrated circuit comprising:
   a RAID controller adapted to induce an operating system to load, into a processing unit on another integrated circuit, a RAID class driver having a physical device object representing a RAID system comprised of a plurality of disks; and
   a first disk controller adapted to interface with at least a portion of the plurality of disks and further adapted to induce the operating system to load a disk controller driver, wherein the disk controller driver is adapted to provide RAID-specific device identifications for the portion of the plurality of disks, and wherein the RAID controller is not adapted to interface with any of the plurality of disks of the RAID system.

17. The integrated circuit of claim 16, wherein the physical device object representing the RAID system is adapted to provide a standard disk device identification to an operating system.

18. The integrated circuit of claim 16, wherein in response to receiving a request to write a data block to the RAID system, the integrated circuit is adapted to mirror the data block on at least a portion of the plurality of disks.

19. The integrated circuit of claim 16, wherein in response to receiving a request to write a first and second data block to the RAID system, the integrated circuit is adapted to write the first data block to a first subset of the portion of the plurality of disks and to write the second data block to a second subset of the portion of the plurality of disks.

20. The integrated circuit of claim 16, wherein in response to receiving a request to write a first and second data block to the RAID system, the integrated circuit is adapted to write an error correction block to at least a subset of the portion of the plurality of disks.

21. The integrated circuit of claim 20, wherein the integrated circuit is adapted to determine the value of an error correction block from the first and second data block.

22. The integrated circuit of claim 16, wherein the integrated circuit is adapted to configure the physical device object representing a RAID system according to RAID configuration data stored in a computer system configuration memory.

23. The integrated circuit of claim 16, further adapted to interface with a second disk controller, wherein the second disk controller adapted to interface with at least a second portion of the plurality of disks and further adapted to induce the operating system to load a second disk controller driver, wherein the second disk controller driver is adapted to provide RAID-specific device identifications for the second portion of the plurality of disks.

24. The integrated circuit of claim 16, further including a second disk controller adapted to interface with at least a second portion of the plurality of disks and further adapted to induce the operating system to load a second disk controller driver, wherein the second disk controller driver is adapted to provide RAID-specific device identifications for the second portion of the plurality of disks.

25. The integrated circuit of claim 24, wherein the first disk controller is of a first type and the second disk controller is of a second type.

26. The integrated circuit of claim 25, wherein the first type is an LIDE type controller and the second type is a SCSI type controller.

27. The integrated circuit of claim 25, wherein the first type is a serial ATA type controller and the second type is a parallel ATA type controller.

28. The integrated circuit of claim 24, wherein the second type is a controller for an external disk.

29. A method of creating a RAID system comprised of a plurality of physical disks and coupled with a computer system running an operating system, the method comprising:
  receiving a RAID-specific device identification for each physical disk of the RAID system, wherein the RAID-specific device identification is received from one or more disk controllers and wherein each disk controller is adapted to interface with at least a portion of the plurality of physical disks, wherein receiving the RAID-specific device identification for each physical disk of the RAID system includes:
  receiving, at a first functional device object of a bus driver from a first disk controller of the one or more disk controllers, the RAID-specific device identification for a first physical disk of the RAID system; and
  receiving, at a first physical device object of the bus driver from the first functional device object, the RAID-specific device identification for the first physical disk;
  binding a respective RAID-specific functional interface to each physical disk of the RAID system, wherein a first respective RAID-specific functional interface is bound to the first device object of the bus driver;
  binding all of the RAID-specific functional interfaces to a same disk object through which the entire RAID system is accessed as a single disk; and
  providing the operating system with a standard disk device identification via the disk object.

30. The method of claim 29, wherein a first disk controller is of a first type and a second disk controller is of a second type.

31. The method of claim 29, further comprising initializing a RAID class driver of the RAID system in response to the identification of a RAID controller.

32. The method of claim 31, wherein the RAID controller comprises hardware.

33. The method of claim 29, further comprising loading a standard disk driver to interface with the disk object, thereby enabling transparent access to the RAID system.

34. The method of claim 29 wherein the RAID-specific device identifications are obtained from a CMOS configuration.

35. The method of claim 29, further comprising:
  loading a RAID class driver when a RAID-specific device identification is received, wherein the RAID class driver binds the respective RAID-specific functional interfaces and binds the RAID-specific functional interfaces to the same disk object representing the entire RAID system; and
  when a general device identification for another disk of the computer system is received, passing the general device identification from a bus driver to a disk driver of the operating system.

* * * * *